(12) United States Patent
Heeter

(10) Patent No.: US 7,576,966 B2
(45) Date of Patent: Aug. 18, 2009

(54) METHOD AND SYSTEM FOR ELECTRICAL BONDING OF FUEL TANK PENETRATIONS

(75) Inventor: Russell J. Heeter, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 599 days.

(21) Appl. No.: 11/360,555

(22) Filed: Feb. 23, 2006

(65) Prior Publication Data

US 2007/0207421 A1 Sep. 6, 2007

(51) Int. Cl.
*H02H 1/00* (2006.01)

(52) U.S. Cl. ..................................... 361/215

(58) Field of Classification Search ................. 361/212, 361/215

See application file for complete search history.

(56) References Cited

U.S. PATENT DOCUMENTS 3,906,308 A * 9/1975 Amason et al. ............. 361/218
4,428,867 A * 1/1984 Billias et al. ................ 252/512

* cited by examiner

*Primary Examiner*—Stephen W Jackson
(74) *Attorney, Agent, or Firm*—Klein, O'Neill & Singh, LLP

(57) ABSTRACT

A system and method for preventing sparking or arcing within a fuel tank area is provided. The method includes installing an electrical bond between a fuel access door to a fuel tank skin; isolating the fuel access door and the fuel tank skin; and installing a fuel seal between the inner side of the fuel tank skin and the fuel access door.

16 Claims, 6 Drawing Sheets

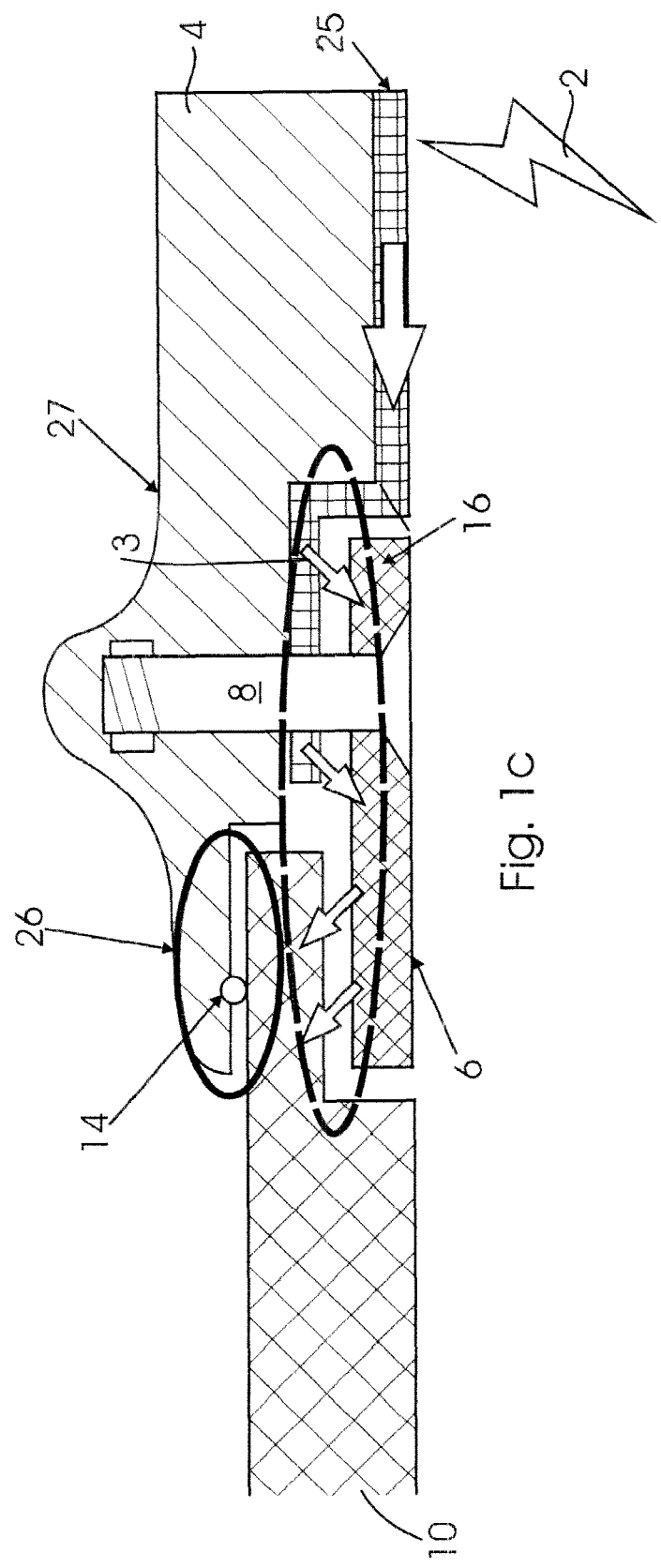

METHOD AND SYSTEM FOR ELECTRICAL BONDING OF FUEL TANK PENETRATIONS

BACKGROUND OF THE INVENTION

1. Field of the Invention

The present invention relates to lightning protection and more particularly, preventing sparking and arcing inside composite fuel tanks when subjected to lightning.

2. Background

Fuel tanks are typically used to carry and store fuel in various transportation systems, including aircrafts. The environment inside fuel tanks is hazardous. Lightning attachment to fuel tank skins can result in a catastrophic failure. Lightning channels are very energetic and when lightning attaches to gaps and interfaces, it has to flow freely through one joint and not another. Fuel tanks are being increasingly constructed of composite materials because they are light and structurally sound. The composite fuel tanks are not as conductive as aluminum, the typical material used for previously designed fuel tanks. Thus components mounted on composite fuel tanks are more susceptible to sparking and arcing when subjected to lightning components. Specifically, the parts of the fuel tank which are susceptible are the fuel access door, which grants access into each bay of the fuel tank, the wing fuel tank, the interface between the fuel access door and the wing skin structure and components mounted to the fuel tank.

Prior systems and methods for preventing fuel tank penetration use expensive electrical bonding features such as electrical conductive rings that are co-bonded with the composite skin and bonding clips. Bonding conductive rings in composite fuel tanks can be expensive and labor intensive. Additionally, cap or brush coat sealing of fasteners is required for fasteners that penetrate the fuel volume. To prevent catastrophic failures as a result of a lightning event, a cost-effective system and method are needed for preventing sparking and arcing within composite fuel tanks.

SUMMARY OF THE PRESENT INVENTION

In one aspect of the present invention, a method for preventing sparking or arcing within a fuel tank area is provided. The method includes installing an electrical bond between a fuel access door to a fuel tank skin; isolating the fuel access door and the fuel tank skin; and installing a fuel seal between the inner side of the fuel tank skin and the fuel access door.

In another aspect of the present invention, a method for preventing sparking or arcing within a fuel tank area is provided. The method includes installing an electrical bond between a fuel tank structure and a washer, the washer is located between a fastener and a fuel tank structure, the electrical bond creates an electrical path for current to flow from a fuel component to the fuel tank structure while avoiding a no current flow region; isolating the fuel tank structure from the fuel component; and installing a fuel seal between an inner side of the fuel tank structure and the fuel component.

In yet another aspect of the present invention, a protection system for preventing sparking or arcing within a fuel tank area is provided. The system includes an electrical bond located between a fuel access door and a fuel tank skin of a fuel tank, for creating an electrical path for current to flow from the fuel access door to the fuel tank skin while avoiding a no current flow region; an isolator provided to isolate the fuel access door from the fuel tank skin; and a fuel seal located between an inner side of the fuel tank skin and the fuel access door.

In yet another aspect of the present invention, a protection system for preventing sparking or arcing within a fuel tank area is provided. The system includes an electrical bond located between a fuel tank structure and a washer, the washer is located between a fastener and a fuel tank structure, the electrical bond creates an electrical path for current to flow from the fuel component to the fuel tank structure while avoiding a no current flow region; an isolator provided to isolate the fuel component from the fuel tank structure; and a fuel seal located between an inner side of the fuel tank structure and the fuel component.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 1a-1c illustrate a three part design of the present invention applied to fuel tank doors mounted on metal and/or carbon fiber reinforced plastic skins;

FIG. 3b illustrates a side view of the fuel access door of FIG. 3a; and

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

According to the present invention, an improved, cost effective and light weight protection method and system to prevent lightning penetrating fuel tanks components including, but not limited to, fuel access doors, fuel pump installations or other components of fuel tanks that may be exposed to either direct or conducted lightning currents. Although the system and method of the present invention are implemented using an aircraft, those skilled in the art will recognize that the principles and teachings described herein may be applied to a variety of structures with fuel tanks made with composite materials, such as automobiles, trains and ships.

Fuel tank components, including, but not limited to, fuel access doors and fuel pump installations must be designed to prevent the incendiary sparking/arcing components within the fuel tank volume when subjected to direct lightning attachment and resultant lightning currents. When fuel tanks, without any lightning protection provisions, are exposed to lightning currents, incendiary sparking/arcing components are created and depending on the installation of the fuel tanks, the incendiary sparking/arcing components may be projected into the fuel tank volume. Failure to design an adequate lightning proof design for fuel tank components can result in two possible failure modes.

The first failure mode is hot particle ejection. When lightning strikes the surface of the fuel access door, lightning components will create an incendiary electrical path between the door/skin interface causing hot particles to inject themselves into the fuel tank volume. The second failure mode is a voltage spark between the door and the inner surface of the fuel tank skin. Both failure modes will create incendiary sparks/arcs inside the fuel tank.

The level of sparking is dependent on the lightning current level at penetration. For example, a low level lightning threat, direct attachment or conducted, will create a spark and arc that is lower in energy and may cause ignition dependent on the flammability of the fuel/air mixture. High lightning energy levels will create very large incendiary sparks and arcs causing pitting at the interface that may cause fuel leaks.

Figure 1A:
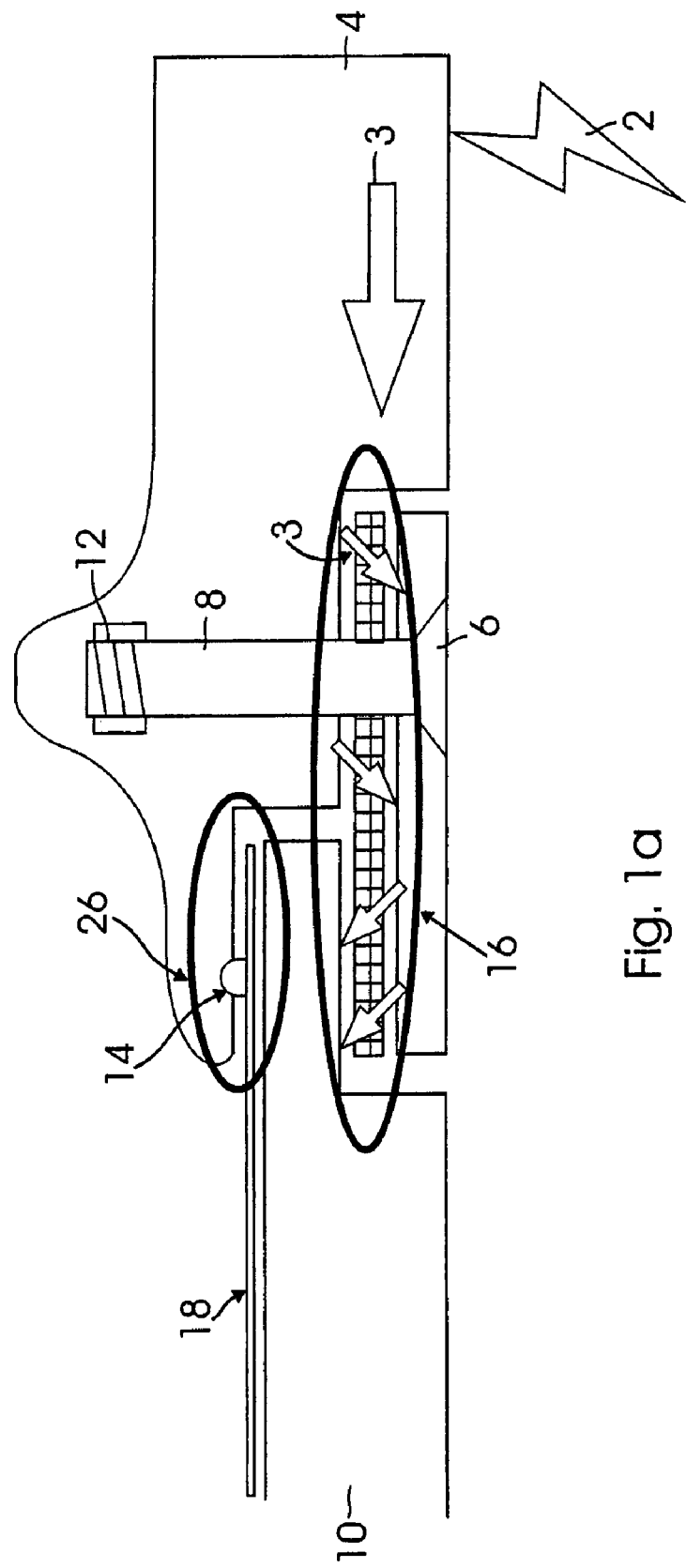
Figure 1B:
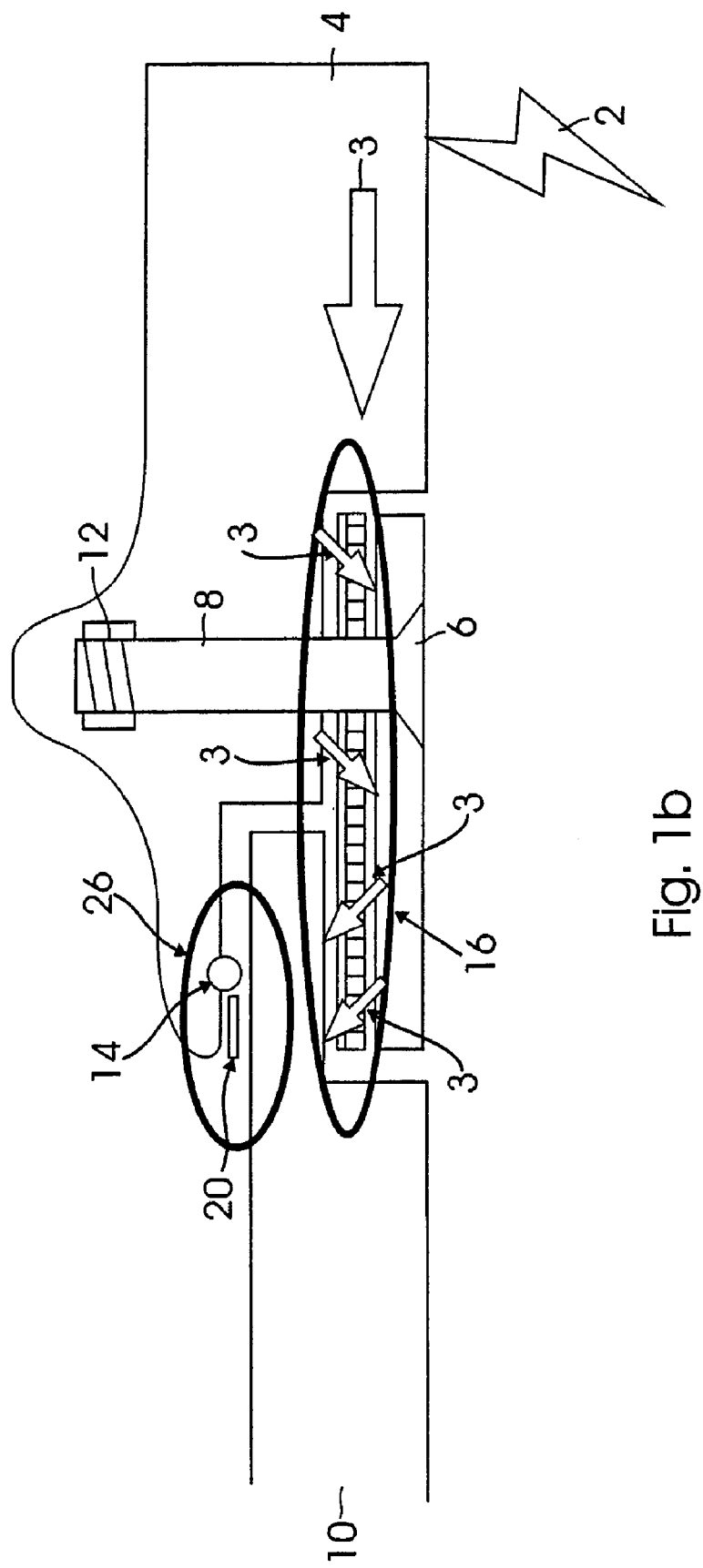

FIGS. 1a-1c illustrate a three part design of the present invention applied to fuel tank doors mounted on metal, carbon fiber reinforced plastic (CFRP) or a combination of metal and CFRP skins. This design prevents incendiary sparking/arcing components within the fuel tank components, including but not limited to, doors mounted on either metal, CFRP or a combination of metal and CFRP skins; or a fuel boost pump mounted on either a metal, CFRP or a combination metal and CFRP structure, according to one embodiment of the present invention.

Lightning 2 attaches to a fuel access door 4 which causes current to flow freely through a clamp ring 6, located on a fastener 8, and into a fuel tank skin 10. The flow of the current generated by lightning 2 is represented by a set of arrows 3. Clamp ring 6 provides a fuel seal for fuel access door 4.

Fastener 8 has a threaded end 12 which extends past fuel tank skin 10, so when fuel access door 4 is bolted to the wing skin on an airplane, fastener 8 can be tightened to create a fuel seal (or "bulb seal") 14. In the first two parts of the design, according to one embodiment of the present invention, an electrical bond 16 is installed between fuel tank skin 10 and fuel access door 4; and an isolator ply 18 is installed directly on fuel tank skin 10 to prevent incendiary sparking/arcing components, caused by lightning 2, within the fuel tank. If current is allowed to flow in a no current flow region 26 between fuel access door 4 and fuel tank skin 10, a spark between fuel access door 4 and fuel tank skin 10 can occur, causing a catastrophic failure.

Electrical bond 16 creates a path for current to flow from fuel access door 4 to fuel tank skin 10 while avoiding no current flow region 26. Several methods are available to achieve this type of bond such as using a fay surface electrical bond. Electrical bond 16 prevents sparking at the location of the defined lightning threat and can be implemented on both metal and CFRP skins.

Isolator ply 18, between fuel access door 4 and fuel tank skin 10, prevents voltage breakdown between the wet side of fuel tank skin 10 and the outer periphery of fuel access door 4. The source of this voltage is due to the resistance across electrical bond 16 and the magnitude of lightning current at the location of penetration. Isolator ply 18 can be comprised of any dielectric that is capable of withstanding this voltage and is compatible with the fuel and material that are used on fuel access door 4. Methods for achieving this isolation include applying a fiberglass layer to the wet side of fuel tank skin 10.

Alternatively, as shown in FIG. 1b, isolator ply 18 can be replaced by an isolator ring 20. Isolator ring 20 is installed on fuel tank skin 10 between the outer periphery of fuel access door 4 and fuel seal 14 in the footprint area (the area between the bulb seal 14 and the outer edge of the door). Fuel seal 14 prevents hot particle projectiles from passing into the fuel tank volume.

FIG. 1c shows the three part design of the present invention applied to a hybrid fuel tank door, i.e. a fuel tank door mounted on a combination of metal and carbon fiber reinforced plastic skins. Using a hybrid plastic door requires the addition of a conductive face sheet 25 and a non-conductive material 27 on the backside of access door 4. The flow of the current 3 generated by lightning 2 passes through conductive face sheet 25 to electrical bond 16.

The third part of the design is the insertion of fuel seal 14, located between inner fuel tank skin 10 and fuel access door 4. Although fuel seal 14 is generally used as a fuel seal, it also aids in preventing plasma blowout that occurs at the fay surface bond of fuel access door 4 and fuel tank skin 10. Fuel seal 14 must seal tightly around the entire footprint of fuel seal 14 for plasma containment.

Electrical bond 16, isolator ply 18 and fuel seal 14 coupled together provide a lightning protection system that is robust and prevents sparking/arcing components with lightning currents as high as 200K amps.

Figure 2A:
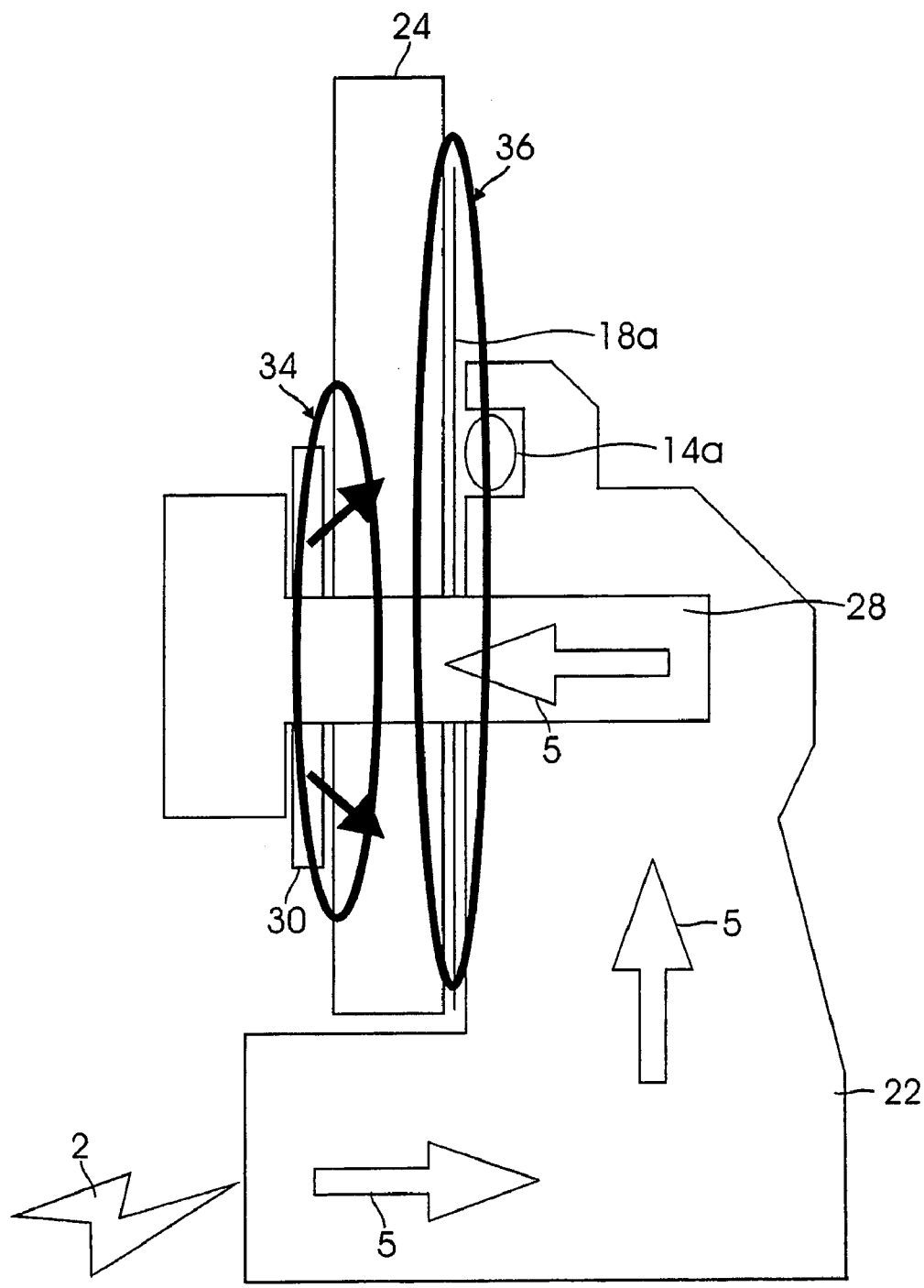
FIGS. 2a and 2b illustrate the three part design of the present invention applied to a fuel component mounted on a metal or carbon fiber reinforced plastic structure.
Figure 2B:
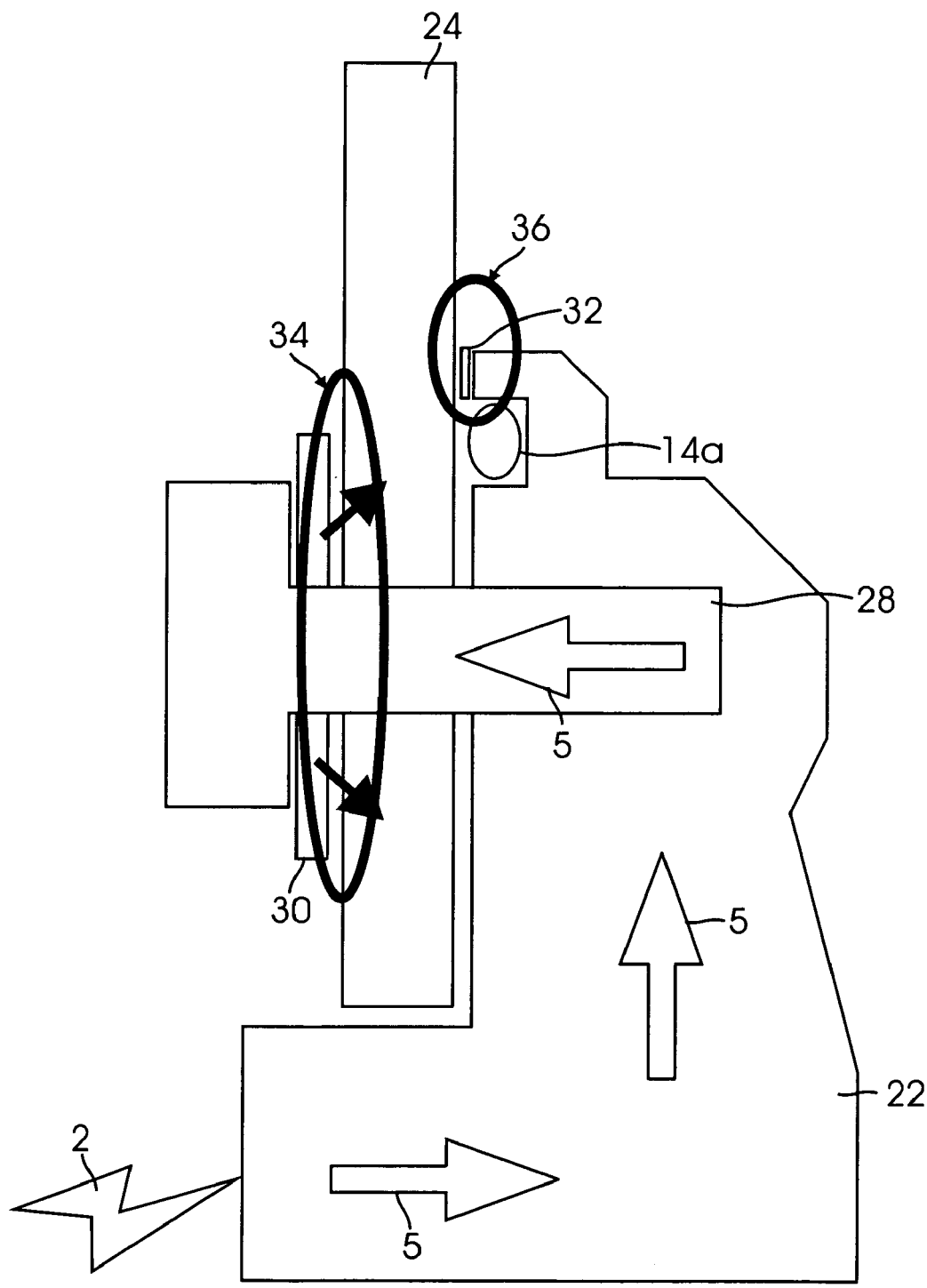

Turning to FIGS. 2a and 2b, the three part design of the present invention applied to a fuel component mounted on a metal and/or CFRP structure, according to a second embodiment of the present invention, is illustrated. In FIG. 2a, lightning 2 attaches to a fuel component 22 causing current to flow freely through fuel component 22 to a fastener 28 and/or into a washer 30, located between fastener 28 and a fuel tank structure 24. Washer 30 is electrically bonded 34 to fuel tank structure 24. The flow of current generated by lightning 2 is represented by a set of arrows 5.

In the first two parts of the design of the present invention according to a second embodiment, an electrical bond 34 is installed between washer 30 of fastener 28 and fuel component 22; and isolator ply 18a is installed directly on fuel tank structure 24 to prevent incendiary sparking/arcing components, caused by lightning 2, within the fuel tank. If current is allowed to flow in a no current flow region 36 between fuel component 22 and fuel tank structure 24, a spark between fuel component 22 and fuel tank structure 24 can occur, causing a catastrophic failure.

Electrical bond 34 creates a path for current to flow from fuel component 22 to fastener 28 and finally to fuel tank structure 24, while avoiding no current flow region 36. Several methods are available to achieve this type of bond such as using a fay surface electrical bond. Electrical bond 34 prevents sparking at the location of the defined lightning threat and can be implemented on both metal and CFRP spars.

Isolator ply 18a between fuel component 22 and fuel tank structure 24 prevents voltage breakdown between the wet side of fuel tank structure 24 and the outer periphery of fuel component 22. The source of this voltage is due to the resistance across electrical bond 34 and magnitude of lightning current at the location of penetration. Isolator ply 18a can be comprised of any dielectric that is capable of withstanding this voltage and is compatible with the fuel and material that are used on fuel component 22. Methods for achieving this isolation include applying a fiberglass layer to the wet side of structure 24.

Alternatively, as shown in FIG. 2b, isolator ply 18a is replaced by an isolator ring 32. Isolator ring 32 is installed on fuel component 22 next to fuel seal 14a in the footprint area to prevent hot particle projectiles from passing into the fuel tank volume.

The third part of the design is installing fuel seal 14*a*, located between the inner side of fuel tank structure 24 and fuel component 22. Although fuel seal 14 is generally used as a fuel seal, it also aids in preventing plasma blowout that occurs at the fay surface bond of fuel component 22 and fuel tank structure 24. Fuel seal 14*a* must seal tightly around the entire footprint of fuel seal 14*a* for plasma containment.

Figure 3A:
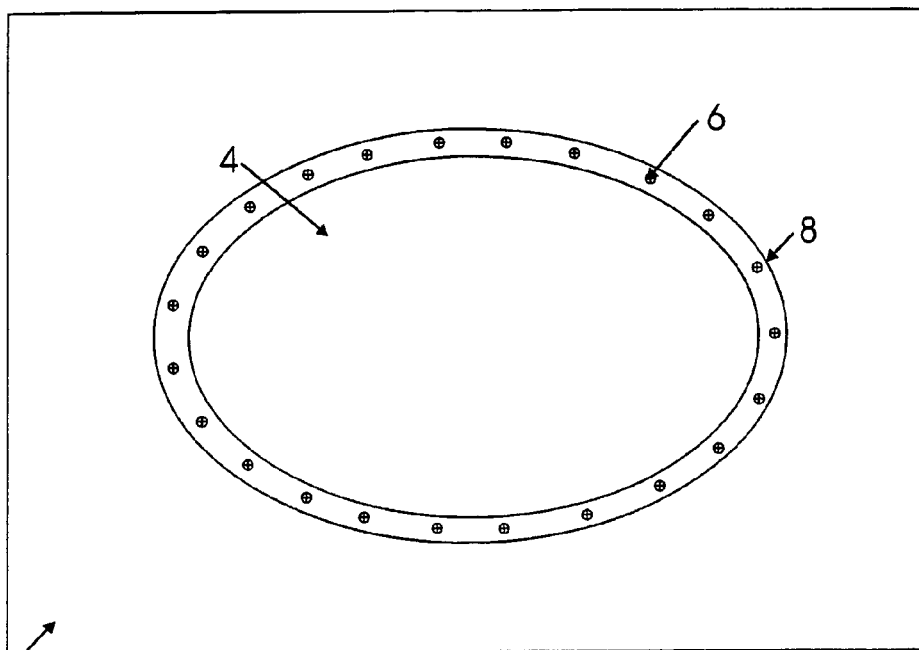
FIG. 3a illustrates a backside view of a fuel access door, according to one aspect of the present invention.
Figure 3B:
Figure 3C:
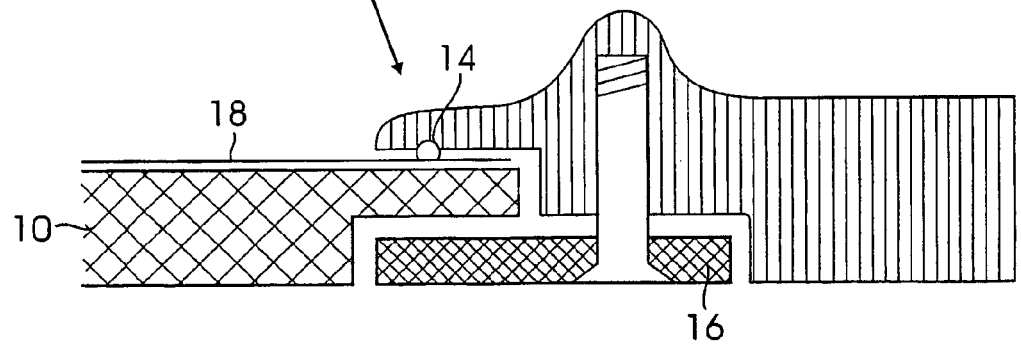
FIG. 3c illustrates an exploded view of a portion of the fuel access door of FIG. 3b.

FIGS. 3*a*-3*c* illustrate various views of fuel access door 4, according to the first embodiment of the present invention. FIG. 3*a* illustrates a non-fuel side view 42 of fuel access door 4, while FIG. 3*b* illustrates a side view of the fuel side of fuel access door 4.

FIG. 3*c* illustrates an exploded view of an outer portion of fuel access door 4 showing the three part design for preventing sparking inside a fuel tank. The first part of the design is the installation of electrical bond 16. The second part of the design is isolating fuel access door 4 from fuel tank skin 10 with isolator ply 18. Finally, the third part of the design is installing fuel seal 14 between fuel tank skin 10 and fuel access door 4.

Although the present invention has been described with reference to specific embodiments, these embodiments are illustrative only and not limiting. Many other applications and embodiments of the present invention will be apparent in light of this disclosure and the following claims.

What is claimed is:

1. A method for creating a protection system for preventing sparking or arcing within a fuel tank area, comprising:
    installing an electrical bond material between a fuel access door and a fuel tank skin creating an electrical path for current to flow from the fuel access door to the fuel tank skin; and
    installing an isolator to electrically isolate an outer periphery of the fuel access door from an inner side of the fuel tank skin to prevent voltage breakdown between the inner side of the fuel tank skin and the outer periphery of fuel access door.

2. The method of claim 1, wherein the isolator comprises an isolator ply.

3. The method of claim 1, wherein the isolator comprises an isolator ring.

4. The method of claim 1, wherein the electrical bond material comprises a fay surface electrical bond.

5. The method of claim 1, wherein the electrical bond material creates a path for current to flow from the fuel access door to the fuel tank skin while avoiding a no current flow region including the isolator.

6. The method of claim 2, wherein the isolator ply is a dielectric.

7. The method of claim 1, wherein the fuel access door is made of metal, CFRP or a combination of metal and CFRP.

8. A protection system for preventing sparking or arcing within a fuel tank area, comprising:
    an electrical bond material installed between a fuel access door and a fuel tank skin of a fuel tank, for creating an electrical path for current to flow from the fuel access door to the fuel tank skin;
    a fuel seal positioned between an inner side of the fuel tank skin and an outer periphery of the fuel access door; and
    an isolator disposed adjacent the fuel seal and provided to electrically isolate the outer periphery of the fuel access door from the inner side of the fuel tank skin to prevent voltage breakdown between the inner side of the fuel tank skin and the outer periphery of fuel access door to create a no current flow region.

9. The system of claim 8, wherein the isolator comprises an isolator ply.

10. The system of claim 8, wherein the isolator comprises an isolator ring.

11. The system of claim 8, wherein the fuel access door is made of metal, CFRP or a combination of metal and CFRP.

12. A protection system for prevent sparking or arcing within a fuel tank area, comprising:
    an electrical bond material located between a fuel access door and a fuel tank skin of a fuel tank for creating an electrical path for current to flow from the fuel access door to the fuel tank skin;
    a fuel seal located between a wetted side of the fuel tank skin and the fuel access door; and
    an isolator positioned between at least an outer edge of the fuel access door and the fuel seal to electrically isolate the fuel access door from the wetted side of the fuel tank skin.

13. The system of claim 12, wherein the isolator comprises an isolator ply.

14. The system of claim 12, wherein the isolator comprises an isolator ring.

15. The system of claim 12, wherein the isolator is mated to the wetted side of the fuel tank skin.

16. The system of claim 12, wherein the isolator is mated to the outer edge of the fuel access door.

* * * * *

UNITED STATES PATENT AND TRADEMARK OFFICE
CERTIFICATE OF CORRECTION

PATENT NO. : 7,576,966 B2 Page 1 of 1
APPLICATION NO. : 11/360555
DATED : August 18, 2009
INVENTOR(S) : Russell J. Heeter It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Seventh Day of September, 2010

David J. Kappos
*Director of the United States Patent and Trademark Office*